(12) United States Patent  
Szuba

(10) Patent No.: US 8,919,166 B2  
(45) Date of Patent: *Dec. 30, 2014

(54) METHOD OF FORMING INDUSTRIAL HOUSINGS

(71) Applicants: Szuba Consulting, Inc., Dearborn, MI (US); Value Extraction LLC, Dearborn, MI (US)

(72) Inventor: Joseph Szuba, Dearborn, MI (US)

(73) Assignees: Szuba Consulting, Inc., Dearborn, MI (US); Value Extraction LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/724,667

(22) Filed: Dec. 21, 2012

(65) Prior Publication Data

US 2013/0117990 A1    May 16, 2013

Related U.S. Application Data

(63) Continuation of application No. 13/404,076, filed on Feb. 24, 2012, now Pat. No. 8,356,506.

(60) Provisional application No. 61/510,601, filed on Jul. 22, 2011, provisional application No. 61/446,552, filed on Feb. 25, 2011.

(51) Int. Cl.  
*B21B 15/00* (2006.01)  
*B21D 22/16* (2006.01)  
*F16H 48/00* (2012.01)  
*B21K 1/26* (2006.01)  
*B21H 7/00* (2006.01)  
*B21B 17/02* (2006.01)  
*B21K 21/16* (2006.01)  
*F16H 48/08* (2006.01)  
*F16H 48/40* (2012.01)

(52) U.S. Cl.  
CPC ............ *B21B 17/02* (2013.01); *B21D 22/16* (2013.01); *F16H 48/00* (2013.01); *B21K 1/26* (2013.01); *F16H 48/08* (2013.01); *B21H 7/00* (2013.01); *B21K 21/16* (2013.01); *F16H 48/40* (2013.01)  
USPC ..................... 72/68; 72/70; 72/82; 72/118

(58) Field of Classification Search  
USPC ............... 72/82, 84, 99, 110, 118, 120, 121, 72/370.15, 51, 52, 367.1, 368, 370.14, 68, 72/70, 71; 29/414, 417  
See application file for complete search history.

(56) References Cited

U.S. PATENT DOCUMENTS 2,265,723 A * 12/1941 Dewey et al. ............... 72/81  
2,363,050 A * 11/1944 Dewey ...................... 29/896.7

(Continued)

FOREIGN PATENT DOCUMENTS

JP       4-37425 A  *  2/1992  .......... B21D 51/16

OTHER PUBLICATIONS

PCT/US13/25836 International Search Report dated Apr. 8, 2013, 2 pages.

(Continued)

*Primary Examiner* — Edward Tolan  
(74) *Attorney, Agent, or Firm* — Warner Norcross & Judd LLP

(57) ABSTRACT

A method of forming a housing which includes roll forming a steel tube radially inwardly with a plurality of rollers each having a rolling axis parallel to the longitudinal axis of the tube, the rollers compressing the tube and forming reduced diameter portions and enlarged diameter portions. The method then includes cutting the tube perpendicular to the longitudinal axis generally midway through an enlarged diameter portion and a reduced diameter portion, forming a plurality of minor image preforms. Finally, the method includes cold working the preforms into the desired shape of the housing and increasing the strength of the steel at least 15% and forming a housing member having enlarged diameter open end and a reduced diameter open end.

10 Claims, 4 Drawing Sheets

(56) References Cited

U.S. PATENT DOCUMENTS

| | | | |
|---|---|---|---|
| 2,988,805 A * | 6/1961 | Thompson | 29/888.43 |
| 3,196,657 A * | 7/1965 | Fromson | 72/199 |
| 3,561,246 A * | 2/1971 | Verdickt | 72/366.2 |
| 3,653,240 A * | 4/1972 | Huthsing, Jr. | 72/82 |
| 4,055,977 A * | 11/1977 | Haswell | 72/84 |
| 4,612,789 A * | 9/1986 | Andriessen | 72/71 |
| 4,625,537 A * | 12/1986 | Aleck | 72/370.15 |
| 4,649,728 A | 3/1987 | LaCount et al. | |
| 4,884,427 A * | 12/1989 | Sawahata et al. | 72/82 |
| 4,998,344 A * | 3/1991 | Hsieh | 29/894.362 |
| 5,419,028 A * | 5/1995 | Manning et al. | 29/417 |
| 5,487,430 A * | 1/1996 | Wentworth et al. | 173/91 |
| 5,598,729 A * | 2/1997 | Hoffmann et al. | 72/8.5 |
| 5,862,694 A * | 1/1999 | Horning | 72/52 |
| 5,924,316 A * | 7/1999 | Streubel et al. | 72/51 |
| 6,233,993 B1 * | 5/2001 | Irie | 72/121 |
| 6,666,062 B2 | 12/2003 | Dole et al. | |
| 6,694,791 B1 * | 2/2004 | Johnson et al. | 72/91 |
| 6,701,617 B2 | 3/2004 | Li et al. | |
| 6,758,077 B2 * | 7/2004 | Kaneko | 72/85 |
| 6,880,220 B2 | 4/2005 | Gandy | |
| 7,107,682 B2 * | 9/2006 | Hauger | 29/897.2 |
| 7,316,142 B2 * | 1/2008 | Lancaster | 72/82 |
| 8,042,258 B2 * | 10/2011 | Sennyu et al. | 29/599 |
| 8,359,893 B2 * | 1/2013 | Pascual Barrio et al. | 72/84 |

OTHER PUBLICATIONS

PCT/US13/25836 Written Opinion of the International Searching Authority dated Apr. 8, 2013, 5 pages.

* cited by examiner

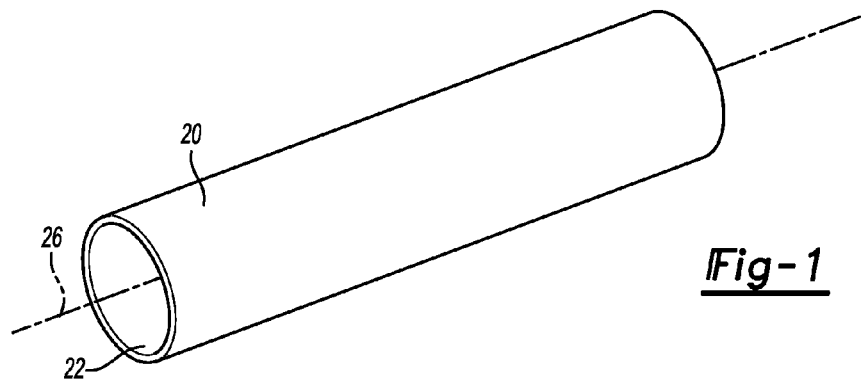
Fig-1
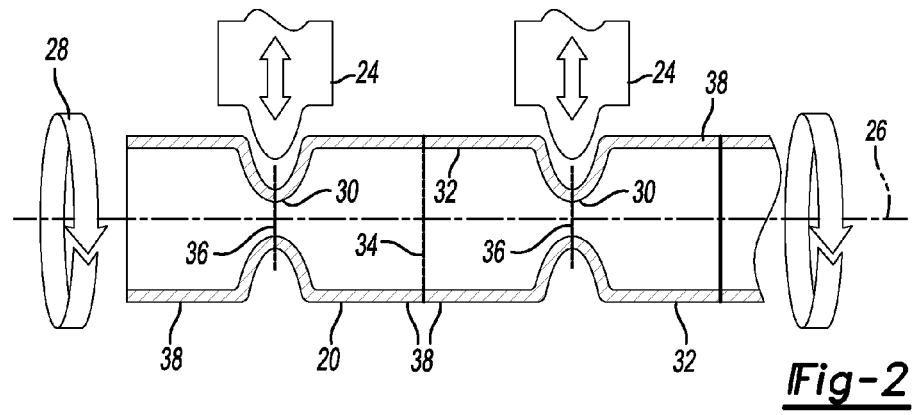
Fig-2
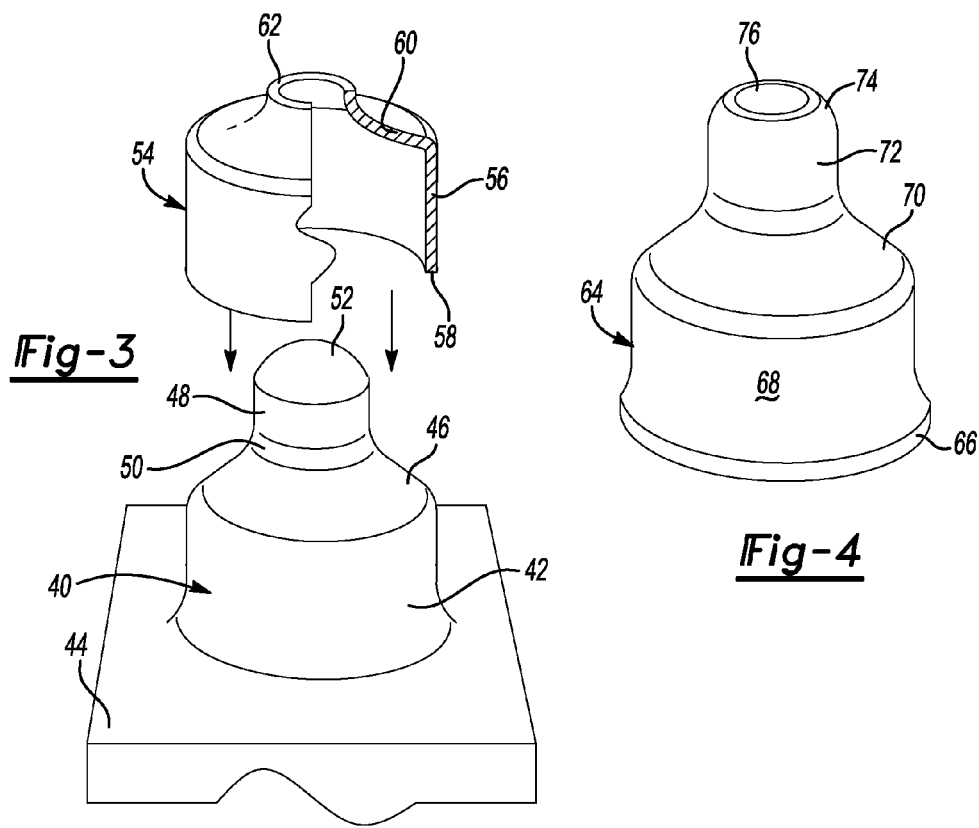
Fig-3
Fig-4

METHOD OF FORMING INDUSTRIAL HOUSINGS

This application is a continuation application of U.S. Non-Provisional Patent Application Ser. No. 13/404,076, filed Feb. 24, 2012 and claims priority to U.S. Provisional Patent Application No's. 61/510,601, filed on Jul. 22, 2011 and 61/446,552 filed on Feb. 25, 2011.

BACKGROUND OF THE INVENTION

Various shapes and types of housings have been used in the automotive and other industries for as long as such industries have existed. These housings have been typically formed from castings when structural performance is required or formed from steel plates or sheets using a stamping process. However, both of the methods of forming housings have known drawbacks.

Where a housing is formed by casting, the method results in excessive mass and typically an imbalance in the component in which the housing is implemented and has resulted in quality problems. Further, cast housings are slow to manufacture due to cooling requirements in a casting dye, which is also known to increase the cost of manufacturing.

Where the housing is formed by stamping a metal sheet or plate, expensive, significantly complex dyes are typically required to form the necessary contours of the housing and the stamping process results in a significant loss of material and the resultant housing typically has poor structural integrity. A progressive stamping method can require up to sixteen stages and post-working operations to achieve the necessary housing configuration.

Thus, there has been a long felt need for an improved method of forming industrial housings which overcomes the above referenced disadvantages and the method of forming an industrial housing from a tube of this invention overcomes these disadvantages.

SUMMARY OF THE INVENTION

The present invention relates to a method of forming a housing, particularly including an industrial housing, such as a housing for automotive components, including converter housings, turbine shrouds and shells, impellor housings and shells, converter covers, catalytic converter housings, clutch housings, air compressor housings, pump housings, double cardon yoke configurations and wheels. The method of this invention includes roll forming a steel tube using a plurality of rollers extending perpendicular to a longitudinal axis of the tube, each roller having a rolling axis parallel to the longitudinal axis of the tube, wherein the rollers compress the tube forming reduced diameter portions and enlarged diameter portions in the tube. As will be understood by those skilled in this art, roll forming a steel tube radially inwardly results in "cold working" of the steel tube which strengthens the steel tube or increases the structural hardness.

The next step in the method of forming a housing of this invention includes cutting the tube perpendicular to its longitudinal axis, preferably about midway through an enlarged diameter portion and a reduced diameter portion, thereby forming a plurality of minor image preforms. As will be understood, the tube may be as long as desired to make a plurality of performs. The method of this invention then includes cold working the preforms into the desired shape of the housing further increasing the strength of the steel at least 15%, forming a housing having an enlarged diameter open end and a reduced diameter portion. The components of an assembly may then be disposed in the housing through the open enlarged diameter end of the housing and the reduced diameter portion retains the components in the housing. As used herein, the term "housing" is used in its broadest sense and the housing itself may be the end product, such as a pulley.

The tube may be formed of any steel, including SAE 1010, 1020 or 1025 steel, although higher carbon steels may be required in certain applications. As will be understood by those skilled in the art, the carbon content of these steels is approximately defined by the last two digits of the SAE number. In one preferred embodiment, the tube is formed from high strength low alloy steel or HSLA steel, particularly for high strength applications, wherein the housing is subject to compression or stress. The steel tube may be welded or seamless and continuous; however, a welded seam tube will be preferred when cost is an issue. As will be understood by those skilled in this art, a welded seam tube is formed by rolling a steel sheet, heating the adjacent edges to the forging temperature of the steel, as by induction heating, and then driving the heated edges together to form a welded seam. The cold working of the preforms into the desired shape of the housing may include inserting a mandrel into the enlarged open end of the preform having the desired shape of the housing, and then rolling the outer surface of the preform inwardly against the mandrel, cold working the steel tube and increasing the strength as much as 20% to 35%. In one embodiment of the method of this invention, the tube-forming rollers may be "crowned," forming a portion of the tube having a greater thickness at predetermined locations for applications requiring greater strength at such locations.

The method of forming a housing from a steel tube of this invention has several important advantages over the prior art. First the method of this invention results in a substantial savings in cost. In a conventional method of forming a housing by stamping, the scrap rate is typically greater than 30% and depending upon the blank-out system, the material savings may exceed 50%. Further, the method of this invention may be utilized to form a housing having a greater thickness at specific areas and is thus thick only where needed for weight and material savings. The housing formed by the method of this invention has greater strength and durability and no expensive exotic tooling is required. Further, the weight and cost savings compared to cast housings for applications requiring greater strength is greater than 50% to 70%. Further, there is a significant manufacturing cost savings compared to a stamping process, wherein the tubes may be formed into housing members at speeds of 30 to 600 feet per minute, versus a transfer press forming the housing members by stamping that can only make 10 to 15 parts per minute.

Other advantages and meritorious features of the method of forming a housing of this invention will be more fully understood from the following description of the preferred embodiments and the appended drawings. As will be understood, however, the description of the preferred embodiments and the drawings are for illustrative purposes only and do not limit the method of this invention except as set forth in the claims.

BRIEF DESCRIPTION OF THE DRAWINGS

FIG. 1 illustrates a conventional steel tube or pipe which may be utilized in the method of forming a housing of this invention;

FIG. 2 illustrates roll forming of the tube radially inwardly with rollers used to form the preforms;

FIG. 3 illustrates one method of cold working the performs into a desired shape of the housing;

FIG. 4 is a perspective view of a mandrel utilized in one embodiment of the cold working step of the method of this invention;

DESCRIPTION OF THE PREFERRED EMBODIMENTS

Figure 5:
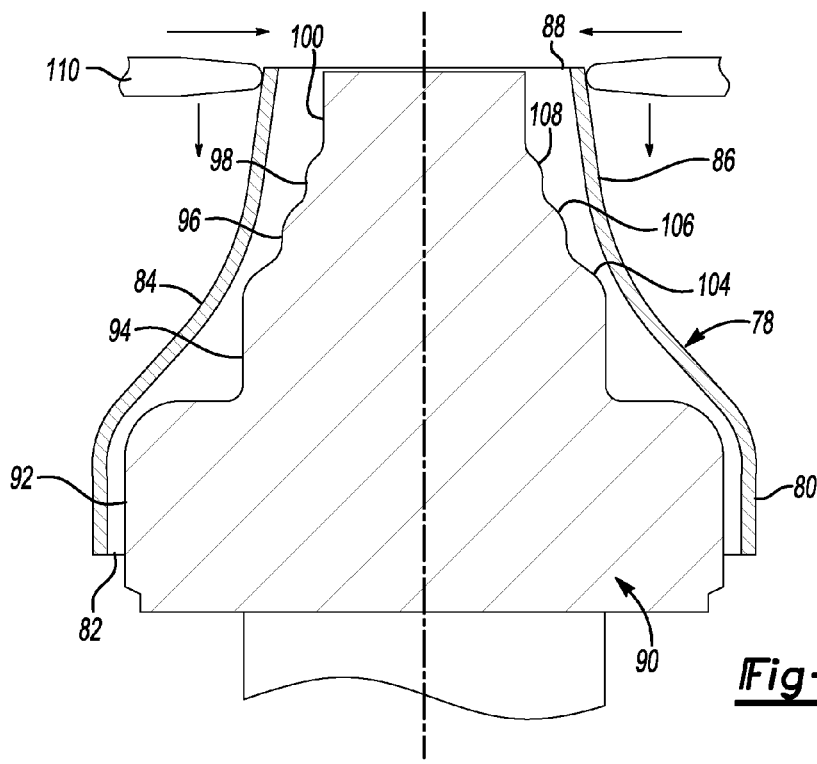
FIG. 5 is a side cross sectional view of another embodiment of the cold working step of the method of this invention.

FIG. 1 illustrates a conventional steel pipe or tube 20 which may be utilized in the method of forming a housing of this invention. The conventional steel tube or pipe 20 has an axial or longitudinal bore 22 and may be formed of any steel, including low and high carbon steels and high strength low alloy (HSLA) steels depending upon the ultimate application of the housing. The diameter and thickness of the tube wall will also depend upon the application and may range for example from 1 mm to 0.5 inches. The tube 20 may include a welded seam (not shown) but the tube may also be seamless depending upon the application. However, a welded seam tube is significantly less expensive than a seamless tube and a welded seam tube is suitable for most applications.

FIG. 2 illustrates one step in the method of forming a housing of this invention, wherein a plurality of rollers 24 roll form the steel tube 20 radially inwardly. In a preferred embodiment, the rollers 24 extend generally perpendicular to a longitudinal axis 26 of the tube 10, wherein each roller has a rolling axis shown by arrow 28 parallel to the longitudinal axis 26 of the tube. The rollers thereby compress the tube forming reduced diameter portions 30 and enlarged diameter portions 32. As stated above, the tube may be of any length to form a plurality of performs. The roll formed tube shown in FIG. 2 is then cut perpendicular to the longitudinal axis 26 about midway through the enlarged diameter portions 32 and the reduced diameter portions 30 as shown by cut lines 34 and 36, respectively. The roll formed tube 20 may be cut by any suitable cutting tool, including a laser cutter or saw.

The cut sections of the roll formed tube are then minor image preforms 38 each have an enlarged diameter opening at the cut lines 34 and a reduced diameter opening at the cut lines 36. The preferred shape of the mirror image preforms 38 will depend upon the desired shape of the housings formed by the method of this invention as will be understood from the following description of the method.

A further step in the method of forming a housing of this invention includes cold working of the steel performs, forming the preforms into the desired shape of the housings and increasing the strength of the steel from 15% to 35% depending upon the cold working method used. In the embodiment shown in FIGS. 3 and 4, the preform is driven onto a mandrel and press rolled, as required. The preform will likely be simultaneously rolled as described below with reference to FIGS. 5 and 6. In the disclosed embodiment, the mandrel 40 includes a cylindrical base portion 42 adjacently base 44, a frustoconical portion 46, and upper smaller diameter cylindrical portion 48, a frustoconical transition portion 50 and a spherical end portion 52. The preform 54, which is driven onto the mandrel 40, in this embodiment includes a cylindrical portion 56 adjacently enlarged diameter open end 58 and a concave frustoconical portion 60 adjacently reduced diameter open end portion 62.

The resultant housing member 64 shown in FIG. 4 includes a radial flange portion 66 formed against the base 44 of the mandrel 40, a generally cylindrical portion 68 formed around the cylindrical portion 42 of the mandrel, a frustoconical portion 70 formed against the frustoconical portion 46 of the mandrel, a cylindrical portion 64 formed against the cylindrical portion 42 of the mandrel, a frustoconical portion 70 formed against the frustoconical portion 46 of the mandrel, a smaller diameter cylindrical portion 72 formed against the smaller diameter cylindrical portions 48 of the mandrel and an inwardly projecting end portion 74 formed against the spherical end portion 52 of the mandrel surrounding the reduced diameter open end portion 76 also formed against the spherical end 52 of the mandrel. As described above, the preform 54 may be driven against the mandrel 40, but is preferably simultaneously rolled as now described with regard to FIGS. 5 and 6.

Figure 6:
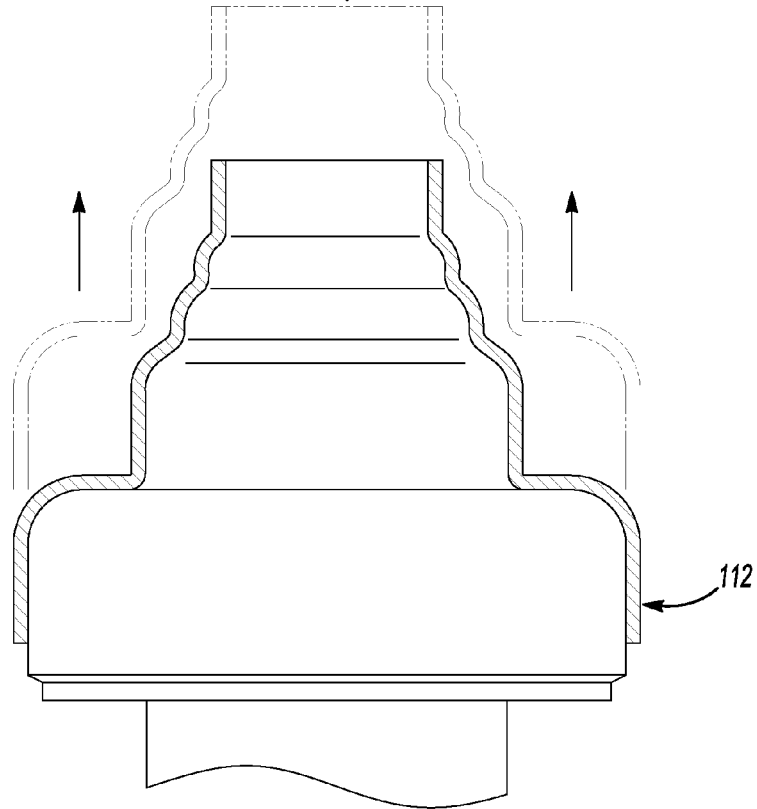
FIG. 6 illustrates the cold working step of FIG. 5, following the forming of the preform into the desired shape of the housing.

The embodiment of the preform 78 shown in FIG. 5 is relatively simple and easy to form. The preform includes a cylindrical end portion 80 at the enlarged diameter open end 82, a first concave frustoconical portion 84, and a second concave frustoconical portion 86 adjacently reduced diameter open end portion. The mandrel 90 includes a plurality of reducing diameter stepped end portions, including a plurality of cylindrical portions 92 to 100, a radial step 102 between the cylindrical portions 92 and 94 and a plurality of reducing diameter frustoconical stepped portions 104 to 108. In this embodiment, the preform 78 is the formed radially inwardly by a roller 110 or a plurality of rollers to conform to the shape of the mandrel 90 as shown in FIG. 6 at 112. This cold working of the preform by rolling as shown in FIGS. 5 and 6, increases the strength of the steel preform 25% to 35%. As set forth above, the cold working of the preforms can be done by driving the preform over a mandrel, rolling the preform over the mandrel or a combination of both.

Figure 7:
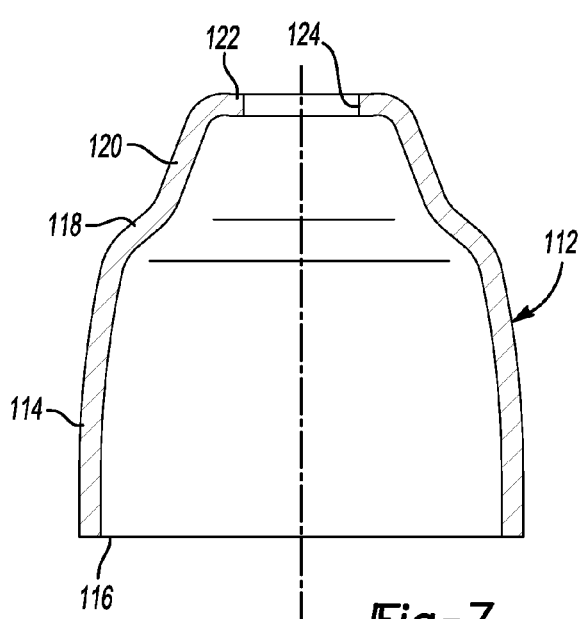
FIG. 7 illustrates a side cross sectional view of an alternative embodiment of a preform.
Figure 8:
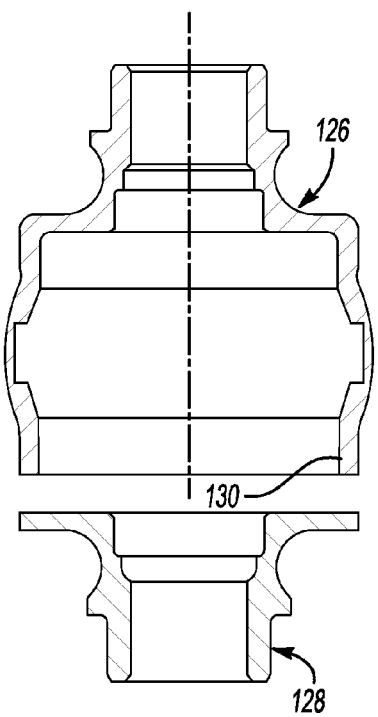
FIG. 8 is a side cross sectional view of a cold worked preform illustrating one method of completing the assembly in the housing.
Figure 9:
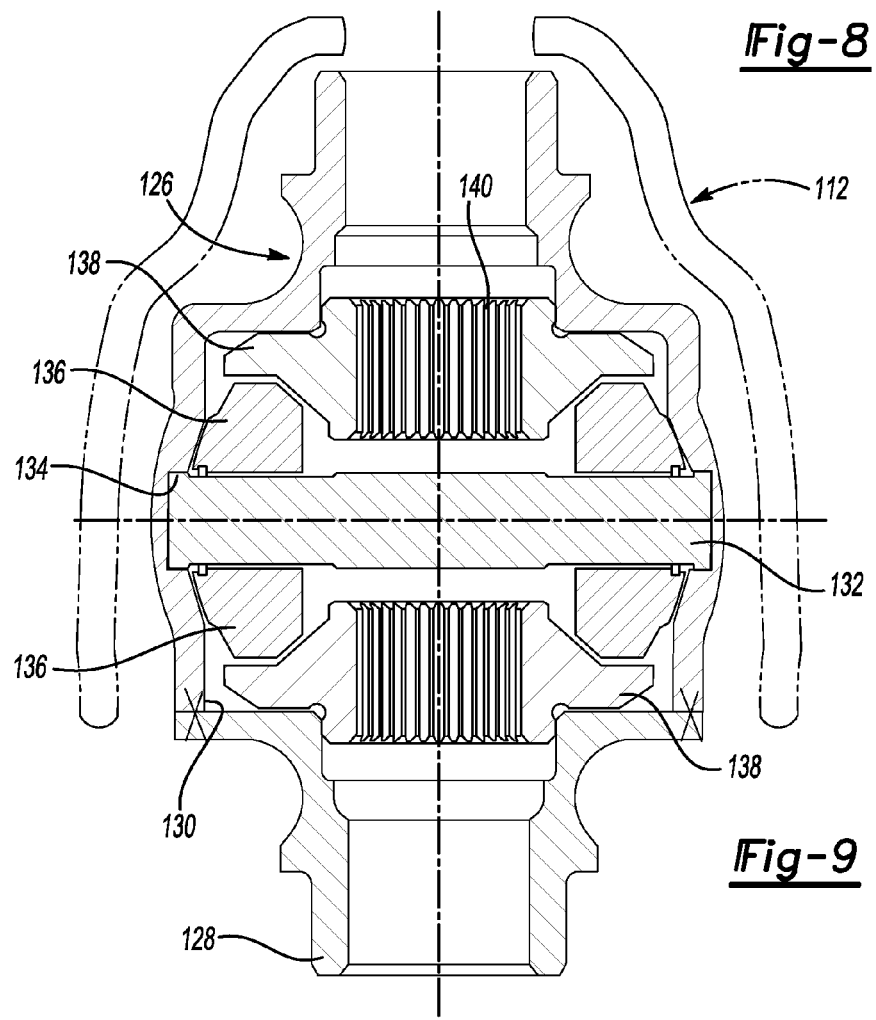
FIG. 9 illustrates the housing assembly shown in FIG. 8.

FIGS. 7 to 9 illustrate another embodiment of the method of forming a housing of this invention, including one further embodiment of a housing assembly. The preform 112 shown in FIG. 7 may be formed by the method described above in regard to FIGS. 1 and 2. This embodiment of the preform 112 includes a cylindrical portion 114 at the enlarged open end 116 of the preform, a first frustoconical portion 118, a second frustoconical portion 120 and a radially inward projecting lip 122 surrounding the reduced diameter open end 124.

The housing member 126 and cover or lid 128 shown in FIG. 8 may be formed by rolling a preform as described above. For example, the preform 112 shown in FIG. 7 may be roll formed into the housing member 126. The preform 112 is also shown in phantom in FIG. 9 to illustrate the relative size of the preform 112 and the resultant housing member 126. Upon roll forming the housing member 126, the components of the assembly are then received in the enlarged open end 130 of the housing member 126 shown in FIG. 8. In this embodiment, the components of the housing assembly include a cross pin 132 anchored in a slot or groove 134 formed in the housing member 126. The assembly further includes two pinion gears 138. A ring gear (not shown) may be welded to the housing member 126. As will be understood by those skilled in this art, the pinion gears each include a splined opening 140. The lid or cap 128 may then be welded to the enlarged open end 130 of the housing member forming an automotive differential mechanism as further described in U.S. Pat. No. 6,945,898, wherein the differential housing is formed by an entirely different method.

Figure 10:
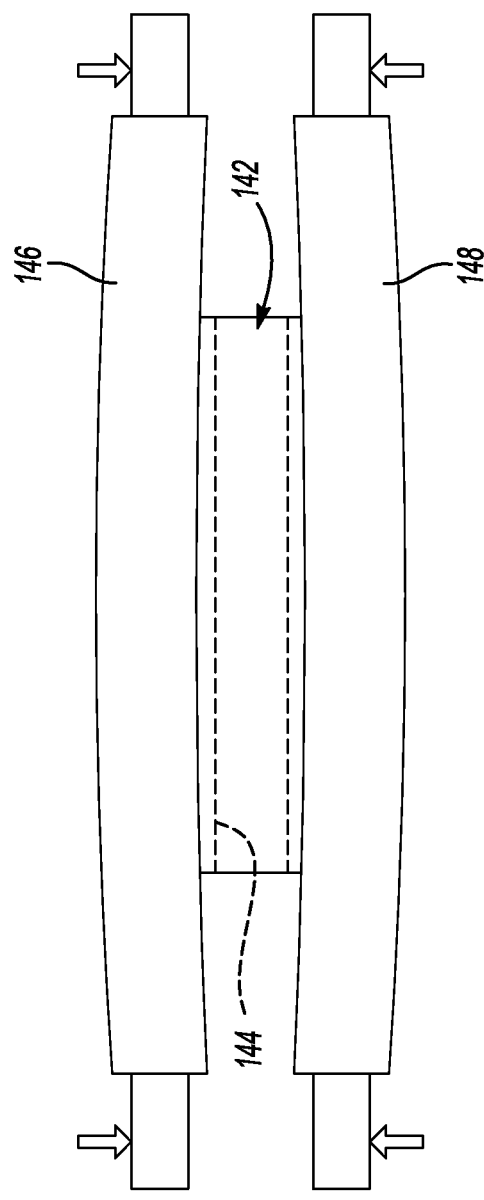
FIG. 10 illustrates one method of roll forming a tube having increased thickness at a desired location.
Figure 11:
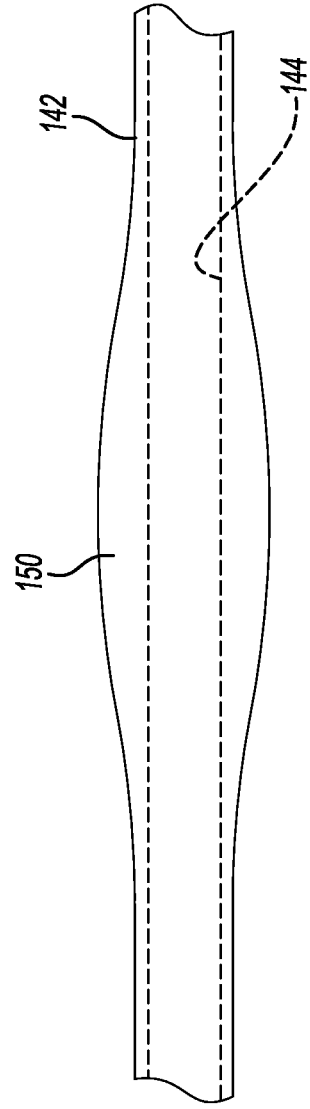
FIG. 11 illustrates the tube formed by the rolling process shown in FIG. 10.

FIGS. 10 and 11 illustrate one method of this invention of forming a tube and housing having a thickened portion for increased strength at predetermined locations for applications. First, a tube 142 having a constant bore 144 is rolled between eccentric rollers 146 and 148. The rollers and the tube 142 may be heated to facilitate the forming operation. The resultant tube includes a thickened central portion 150 as shown in FIG. 11. The tube 142 having a thickened central portion may then be roll formed by the method described above with regard to FIGS. 1 and 2, wherein the reduced diameter portion or the enlarged diameter portion will have a thicker wall for increased strength.

Having described preferred embodiments of the method of forming a housing of this invention, it will be understood by those skilled in the art that various modifications may be made to the disclosed method within the purview of the appended claims. For example only, although the tube 20 show in FIG. 1, portions 38 of the performs and portions 54 of the housings are shown as cylindrical or generally cylindrical, the tubes, performs and housings may have any cross sectional shape, including but not limited to polygonal, including for example octagonal or hexagonal. Briefly, the method of this invention includes roll forming a steel tube radially inwardly using a plurality of rollers extending perpendicular to a longitudinal axis of the tube, wherein each roller has a rolling axis parallel to the axis of the tube; the rollers thereby compressing the tube and forming reduced diameter portions and enlarged diameter portions between the reduced diameter portions. As will be understood, the tube may be of any suitable length to form a plurality of mirror image preforms. The method then includes cutting the tube perpendicular to its longitudinal axis generally midway through an enlarged diameter portions and a reduced diameter portions, thereby forming a plurality of minor image preforms.

The method then includes cold working the preforms into the desired shape of the housing and increasing the strength of the steel at least 15%, forming a housing member having an enlarged diameter open end and a reduced diameter open end. Finally, the housing components of the assembly may then be inserted through the open enlarged diameter end of the housing and the reduced diameter portion then retains the components in the housing.

The invention claimed is:

1. A method of forming a housing assembly, comprising the steps of:
   providing a tube defining an annular wall;
   roll forming said annular wall of said tube radially inwardly with a plurality of rollers toward said longitudinal axis of said annular wall at spaced locations along said tube thereby converting said tube to a plurality of interconnected preforms having contours of varying diameter being complementary to a plurality of said housings while maintaining open ends in said perform defined by said tube;
   separating each said preform from said tube then receiving a mandrel in one of said open ends of each of said preforms and cold working said contours defined by said preform into a desired shape of said housing on the mandrel, and using said mandrel to deform a portion of an inner surface of said preform into features complementary of said housing; and
   disposing components of an assembly through one of said open ends of said housing with some said components engaging said features deformed into said inner surface of said housing when cold working said preform.

2. The method set forth in claim 1, wherein said step of roll forming said annular wall of said tube radially inwardly is further defined by compressing said tube thereby forming reduced diameter portions and large diameter portions.

3. The method set forth in claim 2, further including the step of cutting the tube perpendicular to its longitudinal axis generally midway through a reduced diameter portion and a large diameter portion, thereby forming a plurality of minor image performs, each having a reduced diameter open end and a large diameter open end.

4. The method set forth in claim 1, further including the step of forming a lip in at least one of said open end of said preform thereby defining a reduce diameter open end.

5. The method set forth in claim 1, wherein said step of deform a portion of an inner surface of said preform into features is further defined by forming a thickened portion at or proximate to said feature.

6. The method set forth in claim 1, wherein said step of cold working said preform into a desired shape of said housing on the mandrel is further defined by increasing the strength of a metal forming said housing.

7. The method set forth in claim 1, wherein said step of providing a tube is further defined by providing a tube having a longitudinally welded seam.

8. The method set forth in claim 1, wherein said step of providing a tube is further defined by providing a sheet of metal and rolling the metal into a said tube.

9. The method set forth in claim 1, wherein said step of providing a tube is further defined by providing a sheet of metal and rolling the metal into a said tube using crowned rollers providing increased thickness portions of said tube.

10. The method set forth in claim 1, wherein said step of disposing components of an assembly through one of said open ends of said housing is further defined by disposing gears through one of said open ends of said housing.

\* \* \* \* \*